United States Patent
Venkatramani et al.

(10) Patent No.: US 11,469,956 B2
(45) Date of Patent: Oct. 11, 2022

(54) SERVER-MANAGEMENT MICROSERVICE STOREHOUSE FOR BASEBOARD MANAGEMENT CONTROLLERS

(71) Applicant: Cisco Technology, Inc., San Jose, CA (US)

(72) Inventors: Srisai ganesh v Venkatramani, Bangalore (IN); Yogindar Das Yasodhar, Bangalore (IN); Ganesh kumar A, Madurai (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/935,497

(22) Filed: Jul. 22, 2020

(65) Prior Publication Data

US 2022/0029889 A1    Jan. 27, 2022

(51) Int. Cl.
*H04L 43/08* (2022.01)
*H04L 41/0893* (2022.01)
*H04L 67/1008* (2022.01)
*H04L 67/101* (2022.01)

(52) U.S. Cl.
CPC .......... *H04L 41/0893* (2013.01); *H04L 43/08* (2013.01); *H04L 67/101* (2013.01); *H04L 67/1008* (2013.01)

(58) Field of Classification Search
CPC ... H04L 67/1008; H04L 67/101; H04L 43/08; H04L 41/0893; H04L 41/0894; H04L 43/20
See application file for complete search history.

(56) References Cited

U.S. PATENT DOCUMENTS

| | | | |
|---|---|---|---|
| 8,176,264 B2 | 5/2012 | Moir et al. | |
| 8,381,224 B2 | 2/2013 | Huetter et al. | |
| 9,922,075 B2 | 3/2018 | Fowler | |
| 2015/0220350 A1* | 8/2015 | Katsumata | G06F 9/44505 713/2 |
| 2018/0144135 A1* | 5/2018 | Rihan | H04L 63/1458 |
| 2020/0334359 A1* | 10/2020 | Zhou | G06F 21/572 |
| 2020/0356380 A1* | 11/2020 | Kelly | G06F 11/3051 |

OTHER PUBLICATIONS

Ni et al., "Open Nesting In Software Transactional Memory," Mar. 2007, https://www.researchgate.net/publication/221643596, 12 pages.
Wang et al., "Using Restricted Transactional Memory to Build a Scalable In-Memory Database," Apr. 2014, 15 pages.

* cited by examiner

*Primary Examiner* — Ryan J Jakovac
(74) *Attorney, Agent, or Firm* — Lee & Hayes, P.C.

(57) ABSTRACT

Techniques to facilitate the provision of server-management microservices for baseboard management controllers from a storehouse of such microservices are described herein. A technique described herein includes a server-management microservice storehouse obtaining a request for a server-management microservice for a baseboard management controller (BMC) of a server of a communications network. Further, the storehouse delivers the microservice to the BMC over the communication network. The server-management microservice is a modularized application that interacts with the operating system of the BMC while the microservice executes on the BMC, and the server-management microservice cause management of operations of the server or monitoring of the status of the server.

20 Claims, 5 Drawing Sheets

SERVER-MANAGEMENT MICROSERVICE STOREHOUSE FOR BASEBOARD MANAGEMENT CONTROLLERS

TECHNICAL FIELD

The present disclosure generally relates to providing server-management microservices for baseboard management controllers from a storehouse of such microservices.

BACKGROUND

A server is a network-connected computing system that manages access to resources or services in a communication network. Data centers are packed with hundreds or thousands of servers. A corporate or government entity may manage several data centers.

To make the management of this multitude of physically scattered servers possible, modern servers are equipped with baseboard management controllers (BMCs). A BMC is a small independent processor inside the server. The BMC is a specialized built-in but an independent processor that monitors the physical state of the server hardware and/or the functionality of the server's operating system.

BMC is logically and functionally independent from the motherboard (i.e., main circuit board) of the server itself. As such, the BMC has its own processor, bootloader, operating system (OS), and communications system that is separate from and independent of the server proper.

BMCs have basic processors and embedded operating systems. A BMC has a monolithic firmware package that bundles a bootloader, OS kernel, device drivers, available server-management applications together. This monolithic package is flashed on a read-only memory (ROM) of the BMC. When the server is powered up, the BMC is also powered up. The BMC initiates the bootloader, which leads to the loading of the OS kernel. Once the kernel is operating, the kernel loads the device drivers and the bundled server-management applications. Some applications continue to operate, and others quit and may be reloaded upon demand.

This detailed description of the drawings provides references to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

DESCRIPTION OF EXAMPLE EMBODIMENTS

Overview

This disclosure describes techniques to facilitate the provision of server-management microservices for baseboard management controllers from a storehouse of such microservices. The method to perform the techniques described herein includes a system (e.g., a server-management microservice storehouse) obtaining a request for a server-management microservice for a baseboard management controller (BMC) of a server of a communications network. The BMC of the server has one or more processors that operate independently from a motherboard of the server. Further, the method may include the server-management microservice storehouse delivers the server-management microservice to the BMC over the communication network. The BMC may load and execute the server-management microservice storehouse thereon. The BMC may have a BMC operating system (BMC-OS) executing thereon, which facilitates the loading and execution of the server-management microservice storehouse on the BMC. The server-management microservice storehouse is a modularized application that may interact with the BMC-OS while the server-management microservice storehouse executes on the BMC. The server-management microservice storehouse includes computer-executable instructions that, when executed by the one or more processors of the BMC, cause management of operations of the server or monitoring of the status of the server.

Another method to perform the techniques described herein employ a server that facilitates the use of server-management microservices for baseboard management controllers that were provided by a storehouse of such microservices. The method is performed by a baseboard management controller (BMC) system of a server that may have a BMC operating system (BMC-OS) executing thereon. The BMC-OS facilitates the loading and execution of a server-management microservice on the BMC system. The method includes the BMC system obtaining the server-management microservice from a microservice storehouse on the communication network. The method further includes loading and executing the server-management microservice on the BMC system. The server-management microservice is a modularized application that may interact with the BMC-OS while the server-management microservice executes on the BMC system, and the server-management microservice includes computer-executable instructions that, when executed by the BMC system, cause management of operations of the server or monitoring of the status of the server.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques to facilitate the provision of server-management microservices for baseboard management controllers from a storehouse of such microservices. This disclosure also describes techniques to employed by a server that facilitates the use of server-management microservices for baseboard management controllers that were provided by a storehouse of such microservices.

A server is a network-connected computing system that manages access to resources or services in a communication network. Modern servers are equipped with baseboard management controllers (BMCs). The BMC is a specialized built-in but independent processor that monitors the physical state of the server hardware and/or the functionality of the server's operating system.

BMC has its own processor(s) and its operating system. Without the techniques described herein, a BMC has a monolithic firmware package that bundles a bootloader, OS kernel, device drivers, available server-management applications together. Any update to any part of the bundle (e.g., the server-management applications) necessitates a rebuild of the monolithic firmware package. That updated package must be reloaded on the active BMCs.

Once rebuilt, the updated package is validated to confirm functionality and no unintended dysfunctionality. This is a time-consuming and labor-intensive process. Even a small change necessitates a complete rebuild of the package. Moreover, static images are inflexible and impede research and development.

Also, the package size is limited by the storage capacity of the firmware memory in which the package is stored. Thus, the number of size of server-management applications are limited. Further, customers typically desire only a subset of the server-management applications in the package. Thus, many undesired applications are part of the bundle of applications stored and running on customer's BMCs.

However, according to the techniques described herein, a BMC may dynamically load and execute desired server-management applications. Based on their needs and desires, a customer may download and execute select server-management applications on a BMC from a storehouse of such applications on a communications network.

Generally, the techniques described herein improve the flexibility of the server-management functionality of the BMC of servers. According to the techniques described herein, a customer has access to a storehouse with a menu of available server-management applications from which to choose to dynamically download, load, and execute on their BMCs of their servers.

Certain implementations and embodiments of the disclosure will now be described more fully below regarding the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
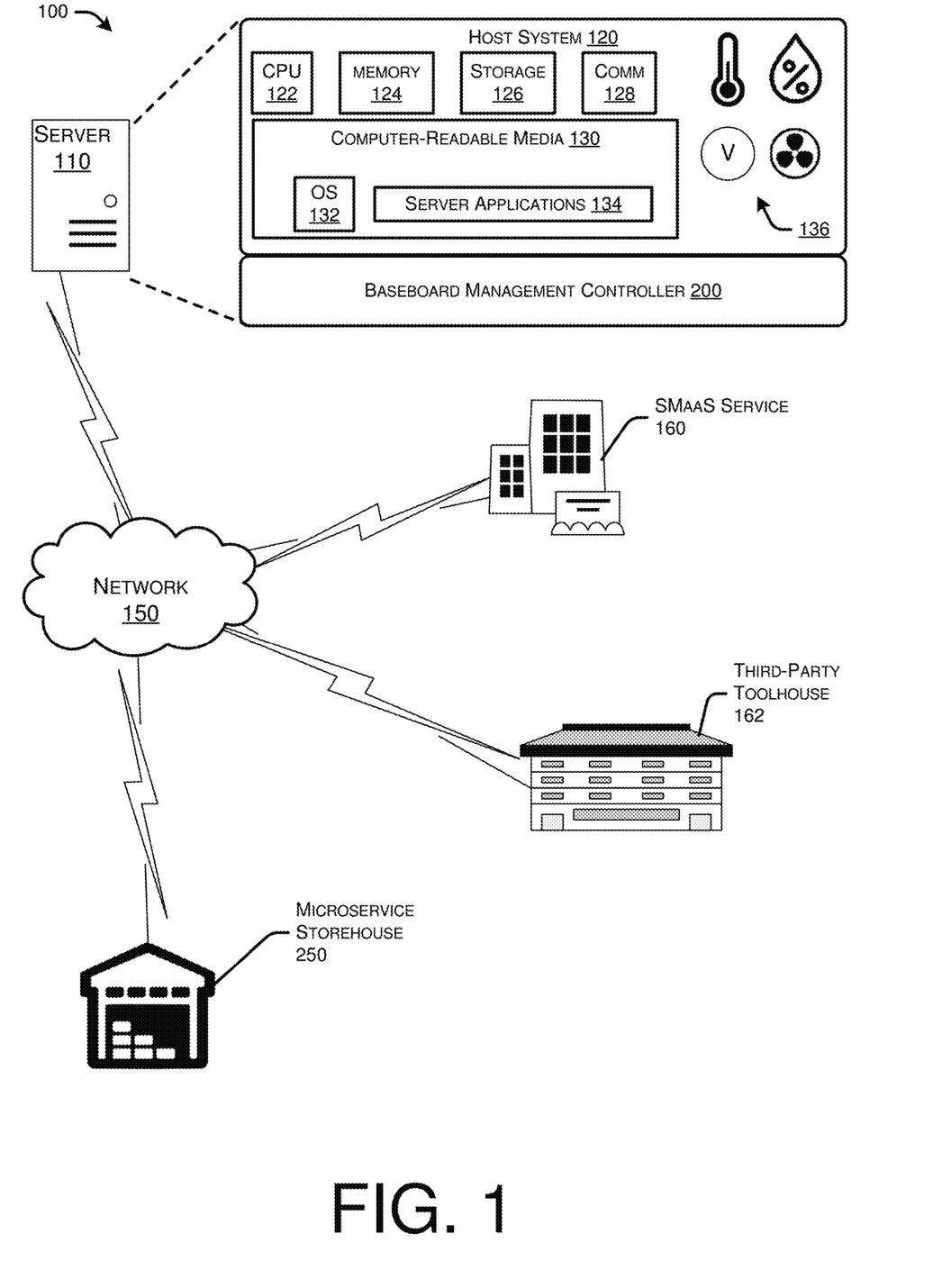
FIG. 1 illustrates an example scenario that implements the facilitation of the provision of server-management microservices for baseboard management controllers from a storehouse of such microservices, in accordance with the techniques described herein.

FIG. 1 illustrates an example scenario 100 that is suitable to facilitate the provision of server-management microservices for baseboard management controllers from a storehouse of such microservices, in accordance with the techniques described herein. The example scenario 100 includes an example server 110, a Server-management-as-a-Service (SMaaS) service 160, a third-party toolhouse 162, and a microservice storehouse 250, which are connected over a communications network 150.

The communications network 150 is a collection of interconnected computing devices (i.e., network nodes) that use a set of common communication protocols over digital interconnections to share resources or services located on or provided by the network nodes. The interconnections between nodes are formed from one or more of a broad spectrum of telecommunication network technologies, based on physically wired, optical, and wireless radio-frequency methods that may be arranged in a variety of network topologies. The so-called cloud and so-called Internet are examples of a suitable communications network.

It should be appreciated that the configuration and network topology described herein has been dramatically simplified and that many more computing systems, software components, networks, servers, services, and networking devices can be utilized to interconnect the various computing systems disclosed herein and to provide the functionality described herein.

The example server 110 is a computing device that includes a host system 120 and a baseboard management controller (BMC) 200. The example server 110 is a network-connected computing system that manages access to resources or services in a communication network. Data centers are packed with hundreds or thousands of servers. A corporate or government entity may manage several data centers The host system 120 performs the functionality associated with servers. For example, the host system 120 may manage access to resources or services in a communication network. Examples of such resources and services include data storage, database access, printer sharing, message exchange, application sharing, communications, file storage, and the like.

The host system 120 includes one or more processors, such as central processing units ("CPUs") 122, memories 124, storage system 126, and communications systems 128. The CPUs 122 can be standard programmable processors that perform arithmetic and logical operations necessary for the operation of the host system 120. The memories 124 may include one or more different types of primary or main memories, such as random-access memory (RAM), read-only memory (ROM), and/or non-volatile RAM (NVRAM). The latter type of memory may be used for storing the bootloader, which is a set of basic instructions to initiate the host system 120 and load its operating system.

The host system 120 can be connected to the storage system 126 that provides non-volatile storage. The storage system 126 can store an operating system 132, server applications 134, and data. The server applications 134 are applications that perform or use the functions of the host system 120, such as manage access to resources or services in a communication network. The storage system 126 can consist of one or more physical storage units.

In addition to the storage system 126, the host system 120 can have access to other computer-readable storage media 130 to store and retrieve information, such as program modules, data structures, or other data. It should be appreciated by those skilled in the art that computer-readable storage media is any available media that provides for the non-transitory storage of data, and that can be accessed by the host system 120.

The host system 120 includes the communications system 128 to enable communications across the communications network 150. The communications system 128 may include one or more network interfaces configured to provide communications between the server 110 and other network-connected devices.

The host system 120 may also include meters 136 for monitoring the physical state of the host system's hardware and/or the functionality of the host system's operating system 132 (or its server applications 134). For example, the meters may measure the temperature of one or more physical components of the host system 120, the humidity of one or more areas inside and around the server 110, the voltage or amperage of the one or more power-supplies of the server, speed of one or more fans of the server, and the properties of one or more communication signals sent from or received by the server. Also, the meters may track actions performed and functionality by the OS 132 of the host system and/or server applications 134 executing thereon.

The server 110 is connected to one or more a server-management subscription/membership platforms, which includes, for example, the SMaaS service 160, the third-party toolhouse 162, and the microservice storehouse 250. Generally, a server-management subscription/membership platform provides resources for users that automate monitoring and management of their servers and data centers.

Often a user subscribes to a server-management subscription/membership platform is a sponsor of a server-management service. Such service provides access to server-management resources. Typically, a user (e.g., a company or government entity) purchase a membership or subscription to the server-management subscription/membership platform. After which, the user has access to the available server-management services and their resources.

Unless the context indicates otherwise, management of a server inherently includes monitoring and/or tracking of the server as well.

Each of the SMaaS service 160, the third-party toolhouse 162, and the microservice storehouse 250 is a functional label for one or more servers in one or more data centers that work cooperatively to provide resources for a server-management subscription/membership platform to the server 110.

A server-management service performs functions via a server-management application on a BMC of a server or remotely from the server being managed. If locally, the server-management application is performed by the BMC of the server. If the server-management application is performed remotely (e.g., on the so-called "cloud"), the BMC of the managed server still interacts with the remotely executing server-management application. So, the server-management application is performing, at least in part, on the BMC of the server being managed.

The microservice storehouse 250 is repository of server-management microservices available to the managed server. A server-management microservice is a modularized server-management application that is separate from and not part of a firmware package that bundles a bootloader, OS kernel, device drivers, available server-management applications together. The microservices is discussed more later.

The SMaaS service 160 is representative of a platform that offers remotely executing server-management applications. Such applications are called Software-as-a-Service (SaaS).

The third-party toolhouse 162 is repository of server-management applications available to the managed server. The label of "third-party" indicates that developers that are independent from the sponsor of the server-management subscription/membership platform. But the server-management subscription/membership platform may vet the offerings of these third parties and stock the third-party toolhouse 162 only with the vetted offerings.

Figure 2:
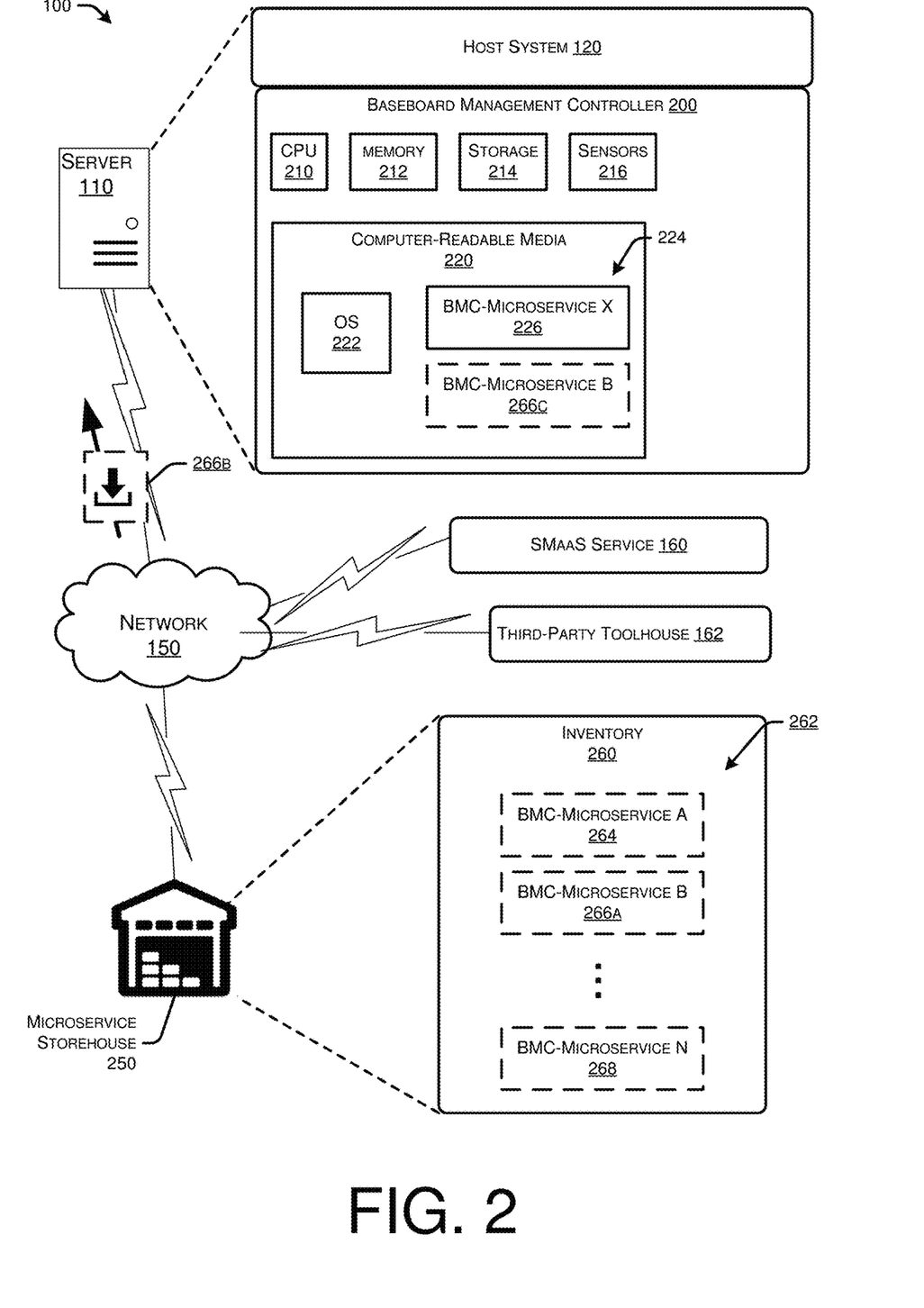
FIG. 2 further illustrates the example scenario of FIG. 1, in accordance with the techniques described herein.

FIG. 2 further illustrates the example scenario 100 shown in FIG. 1. With the host system 120, the server 110 houses the baseboard management controller (BMC) 200. The BMC 200 is a specialized, built-in, and independent processor system that manages and monitors the physical state of the hardware of the host system 120, and/or tracks actions performed by and the functionality of the OS 132 of the host system, and/or tracks the actions and functionality of the server applications 134 executing on the host system.

The BMC 200 is logically and functionally independent from the host system 120. As such, the BMC 200 has its fundamental hardware and software components that are separate from and independent of the host system 120.

The BMC 200 includes one or more processors, such as central processing units ("CPUs") 210, memories 212, storage system 214, and sensors 216. The CPUs 210 can be standard programmable processors that perform arithmetic and logical operations necessary for the operation of the BMC 200. The memories 212 may include one or more different types of primary or main memories, such as random-access memory (RAM), read-only memory (ROM), and/or non-volatile RAM (NVRAM). The latter type of memory may be used for storing the bootloader, which is a set of basic instructions the startup the BMC 200 and loads its operating system 222.

The BMC 200 can be connected to the storage system 214 that provides non-volatile storage. The storage system 214 can store an operating system 222, microservices 224, and data. Herein, the operating system 222 may be called BMC-OS when it is loaded and executing on the BMC 200. The microservices 224 will be discussed later in the description of this drawing figure. The storage system 214 can consist of one or more physical storage units.

In addition to the storage system 214, the BMC 200 can have access to other computer-readable storage media 220 to store and retrieve information, such as device drivers, data structures, or other data. It should be appreciated by those skilled in the art that computer-readable storage media is any available media that provides for the non-transitory storage of data, and that can be accessed by the BMC 200.

The BMC 200 may have its own communications system to enable communications across the communications network 150. In some implementations, the BMC 200 may use the existing communication system 128 of the host system to perform such communication.

The BMC 200 may also include internal sensors 216 for monitoring the physical state of the host system's hardware and/or the functionality of the host system's operating system 132 (or its server applications 134). To accomplish this, the sensors 216 may be connected to the meters 136 in the host system 120.

The sensors 216 may, for example, measure the temperature of one or more physical components of the host system 120, the humidity of one or more areas inside and around the server 110, the voltage or amperage of the one or more power-supplies of the server, speed of one or more fans of the server, and the properties of one or more communication signals sent from or received by the server. Also, the meters may track actions performed and functionality by the OS 132 of the host system and/or server applications 134 executing thereon.

The microservice storehouse 250 is connected to the server 110 via the network 150. The microservice storehouse 250 is a functional label for one or more servers in one or more data centers that work cooperatively to provide an inventory 260 of microservices 262. The microservice storehouse 250 may to store multiple different server-management microservices that are available to be delivered to the BMC 200 upon request.

The microservice storehouse 250 may be part of server-management service offered to subscribed users of servers, such as server 110. The microservice storehouse 250 delivers server-management microservices in their inventory 260 as part of the server-management service.

As used herein, a server-management microservice is a modularized application that may interact with the BMC-OS while the microservice executes on the BMC 200. A server-management microservice includes computer-executable instructions that, when executed by the one or more processors of the BMC 200, cause management of operations of the host system 120 of the server 110 or monitoring of the status of the host system of the server. As such, the server-management microservice is also called a BMC-microservice herein.

As shown in FIG. 2, the inventory 260 of server-management microservices 262 of the microservice storehouse 250 includes BMC-microservice A 264, BMC-microservice B 266a, and BMC-microservice A 268. The ellipsis indicates that there may be many more other BMC-microservices in the inventory 260 that are not shown. The microservices are illustrated in a dashed box. This indicates that the microservice is not loaded and executing on the BMC 200.

The computer-readable media 220 of the BMC 200 shows BMC-microservice X 226 and BMC-microservice B 266c. The BMC-microservice X 226 is illustrated in an unbroken line box to indicate that it is installed and executing on the BMC 200. In contrast, The BMC-microservice B 266c is illustrated in a dashed line box to indicate that it is not yet installed and executing on the BMC 200

According to the techniques described herein, server 110 selects a particular BMC-microservice at a microservice storehouse. For example, server 110 may select BMC-microservice B 266a from the inventory 260 of the microservice storehouse 250. This selection may be performed manually or automatically. For example, a human administrator (i.e., user) may choose a BMC-microservice based on some perceived need, a server-management application may choose a BMC-microservice based on some programmed trigger to do so, or a cloud-based service may make a choice based on some rule-based decision system. Regardless, a computer system is used to make the selection at the microservice storehouse.

The microservice storehouse 250 obtains a request for a BMC-microservice (e.g., BMC-microservice B 266a) for the BMC 200 of a server of a communications network. The request itself may originate from the server 110, the host system 120, the BMC 200, or from some other source associated with the server, host system, or BMC. The BMC 200 has one or more processors that operate independently from the hose system (e.g., motherboard) of the server 110.

In response to the request, the microservice storehouse 250 delivers the BMC-microservice B 266a to the BMC 200 over the communication network 150. This is shown by the dashed box of BMC-microservice B 266b, which indicates that BMC-microservice B is being downloaded from the microservice storehouse 250 to the BMC 200 over the network 150.

The BMC may load and execute the BMC-microservice B thereon. Unless the context indicates otherwise, loading herein refers to the initiation of execution a program by moving one or more of its instruction set from storage into the working memory of a computing system. Unless the context indicates otherwise, executing herein refers to the performance of the instructions of a program on a computing system.

The dashed box of BMC-microservice B 266c indicates that the BMC-microservice B is stored on the accessible computer-readable media 220 of the BMC 200. Still, at this point, it is not yet loaded, and executing liked BMC-microservice X 226 is.

The BMC 200 has its own operating system 222—which is called the BMC operating system (BMC-OS)—executing thereon and that BMC-OS 222 facilitates the loading and execution of the BMC-microservice B 266c on the BMC 200. That is, the BMC-OS is separate from and not part of the BMC-microservice B 266c itself. Indeed, the already loaded and executing BMC-OS manages and helps in the loading and execution of the BMC-microservice B 266c on the BMC 200.

Unlike the monolithic BMC firmware packages, the BMC-microservice B 266c is a modularized application that may interact with the BMC-OS 222 while the BMC-microservice B 266c executes on the BMC 200. The BMC-microservice B 266c may use application programming interfaces (APIs) to communicate with the BMC-OS 222.

The BMC-microservice B 266c may be modularized as a container. As such, the BMC-microservice may be further described as containerized. A containerized BMC-microservice is packaged to perform an operating system (OS) level virtualization. OS-level virtualization refers to an operating system paradigm in which the kernel allows the existence of multiple isolated user-space instances. OS-level virtualization goes by many different names, such as containers, zones, virtual private servers, partitions, virtual environments (VEs), virtual kernels, or jails.

The containerized BMC-microservice operates as though it is running on an ordinary OS of the BMC 200, and as such, the BMC-microservice can see all resources (e.g., connected devices, files and folders, network shares, CPU power, quantifiable hardware capabilities) of the BMC 200. However, the programs running inside of the containerized microservice can only see the container's contents and devices assigned to the containerized microservice.

Each containerized BMC-microservice is isolated from other such microservices active on the BMC 200. This isolation also enables high availability (HA) of the BMC 200 by shielding the problems in one containerized BMC-microservice, not affecting other containerized BMC-microservices or the entire BMC. If any containerized BMC-microservice is misbehaving or has a security flaw, that BMC-microservice can be blacklisted/withdrawn from the microservice storehouse 250. Before running any BMC-microservice, BMC 200 can synchronize with the microservice storehouse 250 and avoid running any blacklisted BMC-microservice.

The BMC-microservice B 266c includes computer-executable instructions that, when executed by the one or more processors of the BMC 200, cause management of operations of the server 110 or monitoring of the status of the server 110 via, for example, the sensors 216 and meters 136.

Thus, BMC 200 may access internal sensors (e.g., the sensors 216 and meters 136) to measure the physical properties of the host system 120 (e.g., motherboard) of the server 110. Examples of such physical properties include temperature, humidity, power-supply voltage, fan speed, and communication signals.

Also, the BMC 200 may monitor functions of the operating system 132 of the host system 120 of the server 110. The BMC 200 may monitor functions of the server applications 134 of the host system 120 of the server 110.

While the discussion of this technology has focused on the microservice storehouse 250, other implementations may employ the third-party toolhouse 162 in the same manner. Similarly, other implementations may employ the SMaaS service 160 in largely the same manner. While the bulk of the server-management application is executed remotely from the BMC 200, at least some portion—which can be a called a microservice—of the function of the server-management application is performed locally on the BMC 200.

Figure 3:
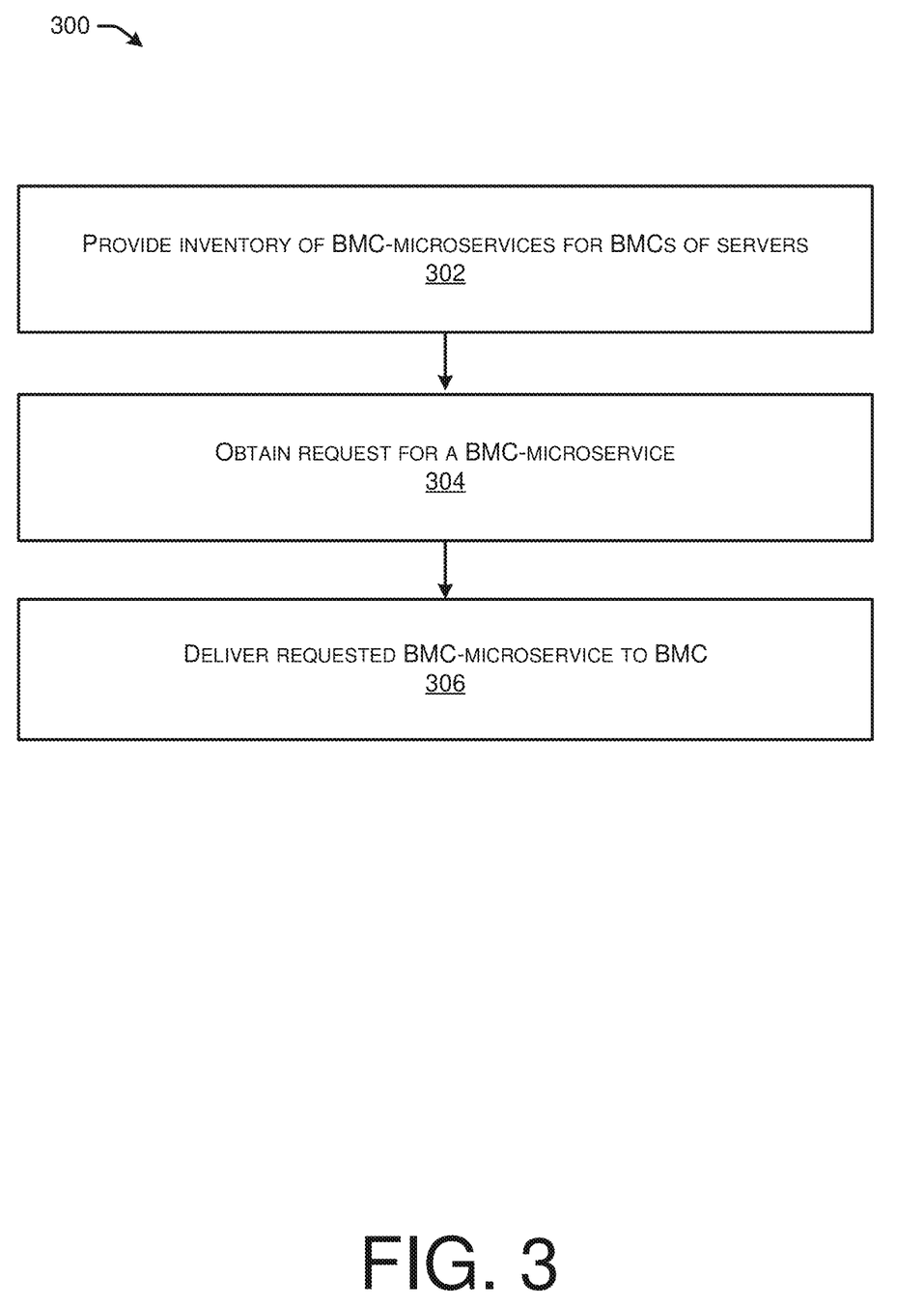
FIGS. 3 and 4 illustrate flow diagrams of example methods for the facilitation of the provision of server-management microservices for baseboard management controllers from a storehouse of such microservices, in accordance with the techniques described herein.
Figure 4:
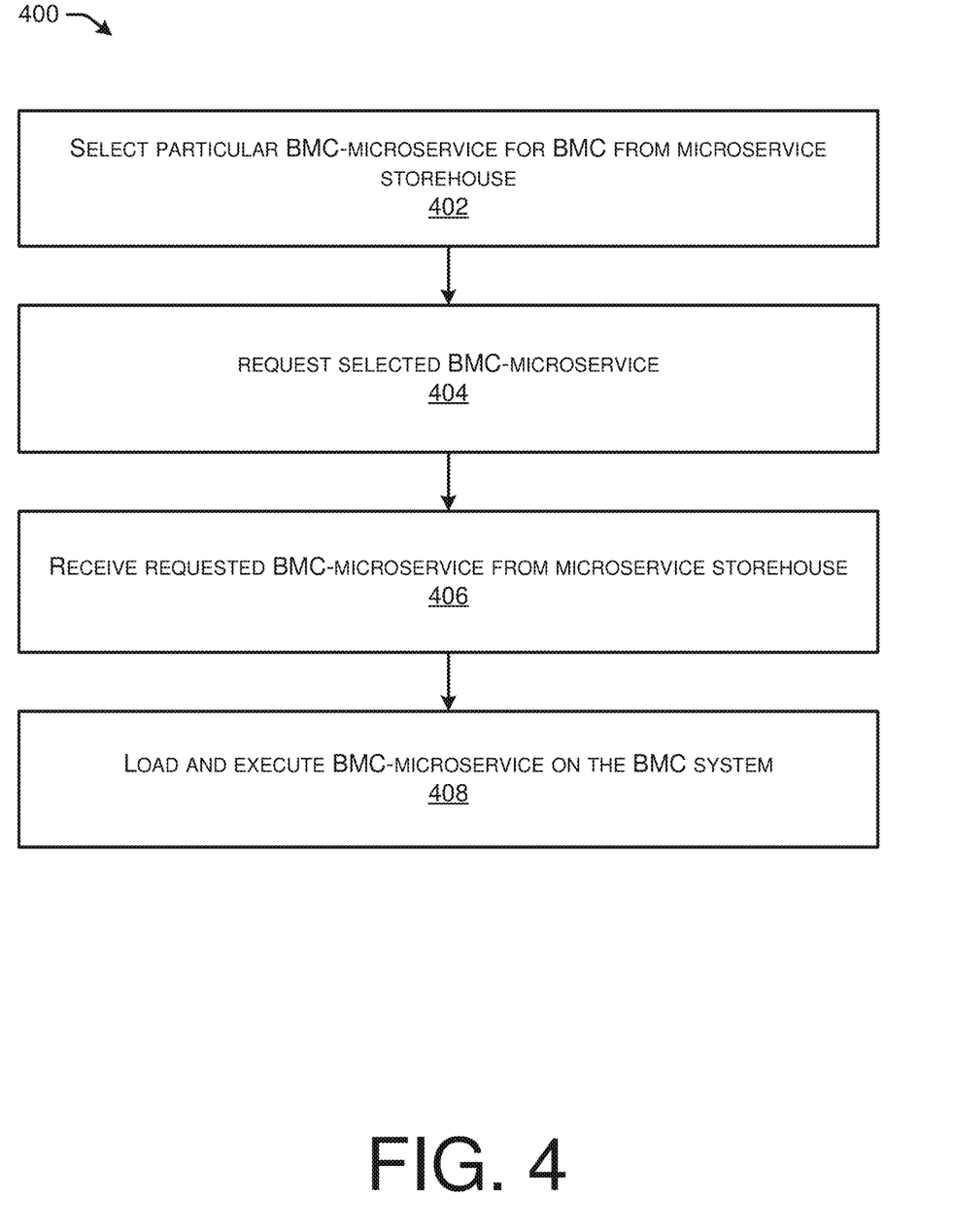

FIGS. 3-4 shows flow diagrams of example methods 300 and 400 to facilitate the provision of server-management microservices for baseboard management controllers from a storehouse of such microservices. The example methods 300 and 400 illustrates aspects of the functions performed at least partly by servers, their BMCs, and/or a server-management subscription/membership platforms (which include, for example, microservice storehouses).

The microservice storehouse 250, as described in FIGS. 1 and 2, is an example of device or system that may implement example method 300 or a portion thereof. The server 110 and/or its BMC 200, as described in FIGS. 1 and 2, are examples of devices and systems that may implement example method 400 or a portion thereof.

The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel or a different order than those described herein. Some or all of these operations can also be performed by components other than those specifically identified. Although the techniques described in this disclosure is with reference to specific components, in other examples, the techniques may be implemented by fewer components, more components, different components, or any configuration of components.

At 302, a system provides an inventory of BMC-microservices. Such an inventory may be provided via a server-management subscription/membership platform. More particularly, a microservice storehouse may be the system that provides the inventory of BMC-microservices. For example, the microservice storehouse 250 provides the inventory 260.

At 304, the system obtains a request for a particular BMC-microservice for a BMC of a server of a communications network. For example, the microservice storehouse 250 may receive a request for the BMC-microservice B 266a for the BMC 200. The request itself may originate from the server 110, the host system 120, the BMC 200, or from some other source associated with the server, host system, or BMC.

At 306, in response to the request, the system delivers the requested BMC-microservice to the BMC over the communication network. For example, the microservice storehouse 250 may deliver the BMC-microservice B 266a to the BMC 200 over the communication network 150.

Subsequently, the BMC loads and executes the delivered BMC-microservice to perform server-management functions on the BMC's server.

FIG. 4 shows the flow diagram of the example method 400, which focuses on the actions of the BMC in relation to a server-management subscription/membership platform.

At 402, a system selects a particular BMC-microservice from an inventory of BMC-microservices of a server-management subscription/membership platform. For example, the BMC 200 may be the system that performs the selection of BMC-microservice B 266a from the inventory 260 of the microservice storehouse 250.

At 404, the system requests the selected BMC-microservice from the server-management subscription/membership platform. For example, the BMC 200 request the BMC-microservice B 266a from the inventory 260 of the microservice storehouse 250.

At 406, the system receives the requested BMC-microservice from the server-management subscription/membership platform. For example, the microservice storehouse 250 send BMC-microservice B 266b and the BMC 200 receives the BMC-microservice B 266c from the microservice storehouse 250.

At 408, the BMC may load and execute the received BMC-microservice on the BMC. For example, BMC 200 may load and execute BMC-microservice B 266c on the BMC. The operating system of the BMC (BMC-OS) facilitates the loading and execution of the BMC-microservice on the BMC.

Unlike the monolithic BMC firmware packages, the BMC-microservice is a modularized application that may interact with the BMC-OS while the BMC-microservice executes on the BMC. The BMC-microservice may use application programming interfaces (APIs) to communicate with the BMC-OS.

The BMC-microservice includes computer-executable instructions that, when executed by the one or more processors of the BMC, cause management of operations of the server or monitoring of the status of the server via, for example, the sensors and meters.

Figure 5:
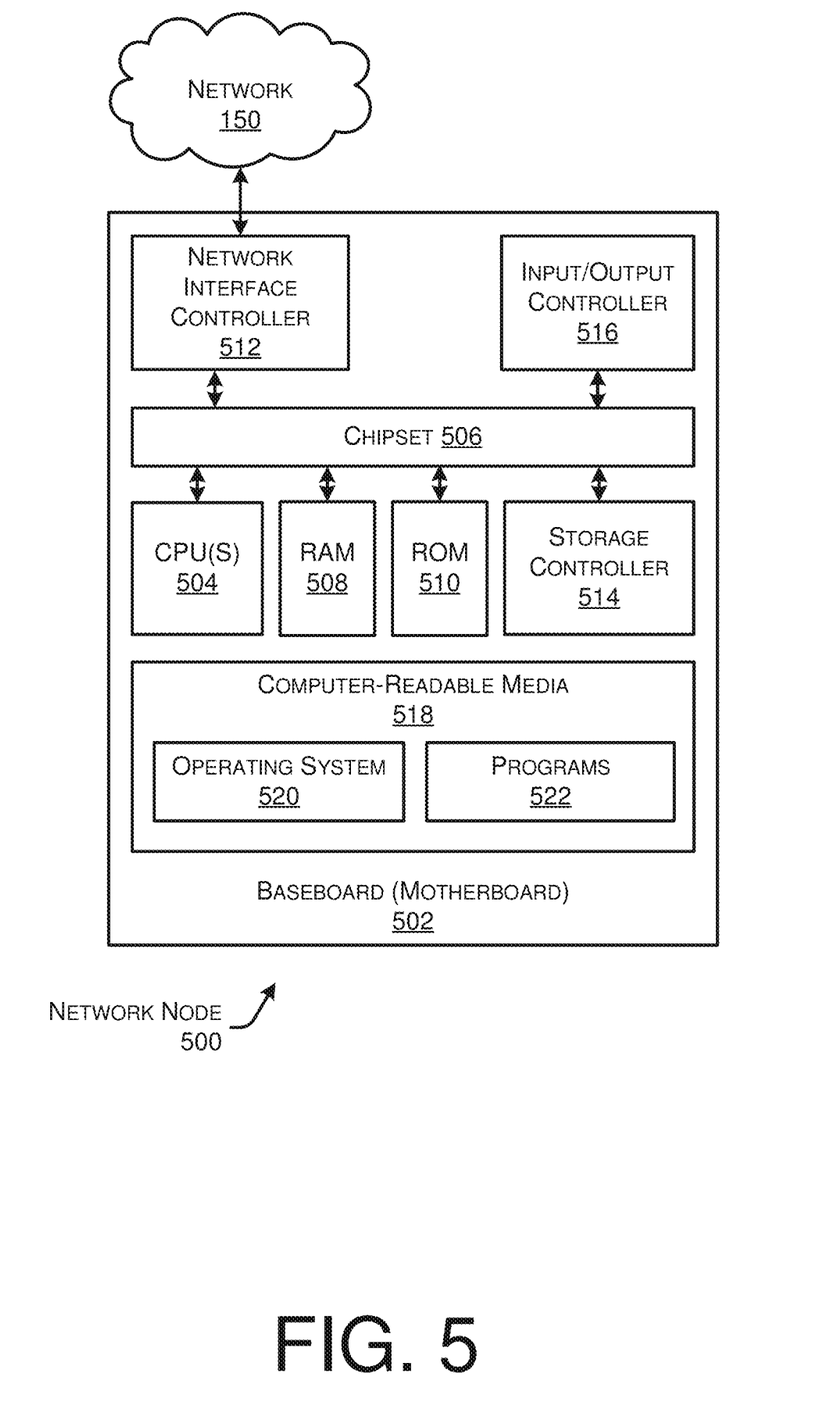
FIG. 5 is a computer architecture diagram showing an illustrative computer hardware architecture for implementing a network node that can be utilized to implement aspects of the various technologies presented herein.

FIG. 5 shows an example computer architecture for a network node 500 capable of executing program components for implementing the functionality described above. The computer architecture shown in FIG. 5 illustrates a conventional server computer, workstation, desktop computer, laptop, tablet, network appliance, e-reader, smartphone, or another computing device, and can be utilized to execute any of the functionalities presented herein. The network node 500 may, in some examples, correspond to one of many types of network devices, such as servers, switches, routers, hubs, bridges, gateways, modems, repeaters, access points, etc. The computer architecture shown in FIG. 5 and described hereafter is suitable for a server, host system, and/or BMC capable of implementing one or more portions of the techniques described herein.

The network node 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the network node 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the network node 500. The chipset 506 can further provide an interface to a computer-readable storage medium such as read-only memory ("ROM") 510 or non-volatile RAM ("NVRAM") for storing basic routines that help to startup the network node 500 and to transfer information between the various components and devices. The ROM 510 or NVRAM can also store other software components necessary for the operation of the network node 500 in accordance with the configurations described herein.

The network node 500 can operate in a networked environment using logical connections to remote computing devices and computer systems through a network, such as the network 150. The chipset 506 can include functionality for providing network connectivity through a NIC 512, such as a gigabit Ethernet adapter. The NIC 512 is capable of connecting the network node 500 to other computing devices over the network 150. It should be appreciated that multiple NICs 512 can be present in the network node 500, connecting the computer to other types of networks and remote computer systems.

The network node 500 can be connected to a storage device 518 that provides non-volatile storage for the computer. The storage device 518 can store an operating system 520, programs 522, and data, which have been described in greater detail herein. The storage device 518 can be connected to the network node 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other types of interface for physically connecting and transferring data between computers and physical storage units.

The network node 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the network node 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The network node 500 can further read information from the storage device 518 by detecting the physical states or characteristics of one or more particular locations within the physical storage units.

In addition to the mass storage device 518 described above, the network node 500 can have access to other computer-readable storage media to store and retrieve information, such as program modules, data structures, or other data. It should be appreciated by those skilled in the art that computer-readable storage media is any available media that provides for the non-transitory storage of data, and that can be accessed by the network node 500.

In some examples, the operations performed by the server 110, the BMC 200 and/or one or more servers of the microservice storehouse 250 of the network 150, and or any components included therein, may be supported by one or more devices similar to network node 500. Stated otherwise, some or all of the operations performed in accordance with methods 300 and 400 may be performed by one or more network nodes 500 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the network node 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the network node 500.

In one embodiment, the storage device 518 or other computer-readable storage media is encoded with computer-executable instructions which, when loaded into the network node 500, transform the computer from a general-purpose computing system into a special-purpose computer capable of implementing the embodiments described herein. These computer-executable instructions transform the network node 500 by specifying how the CPUs 504 transition between states, as described above. According to one embodiment, the network node 500 has access to computer-readable storage media storing computer-executable instructions which, when executed by the network node 500, perform the process described above with regard to FIGS. 3 and 4. The network node 500 can also include computer-readable storage media having instructions stored thereupon for performing any of the other computer-implemented operations described herein.

The network node 500 can also include one or more input/output controllers 516 for receiving and processing input from several input devices, such as a keyboard, a mouse, a touchpad, a touch screen, an electronic stylus, or other types of input devices. Similarly, an input/output controller 516 can provide output to a display, such as a computer monitor, a flat-panel display, a digital projector, a printer, or other types of output devices. It will be appreciated that the network node 500 might not include all of the components shown in FIG. 5, can include other components that are not explicitly shown in FIG. 5, or might utilize an architecture completely different than that shown in FIG. 5.

As described herein, the network node 500 may include one or more hardware processors 504 (processors) configured to execute one or more stored instructions. The processor(s) 504 may comprise one or more cores. Further, the network node 500 may include one or more network interfaces configured to provide communications between the network node 500 and other devices, such as communications. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure performed by the server 110, the BMC 200 and/or one or more servers of the microservice storehouse 250. For instance, the programs 522 may cause the network node 500 to perform techniques to facilitate provision of server-management microservices for baseboard management controllers from a storehouse of such microservices.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
    one or more processors; and
    one or more non-transitory computer-readable media storing computer-executable instructions that, when executed by the one or more processors, cause the one or more processors to:
        obtain, at a microservice management platform, a request for a BMC-microservice for a baseboard management controller (BMC) of a server of a communications network, wherein the BMC of the server has one or more processors that operate independently from a motherboard of the server, wherein the microservice management platform is supported by on one or more computing devices that are remote from the server; and
        deliver, from the microservice management platform and over the communication network, the BMC-microservice to server that includes the BMC, the BMC being configured to load and execute the BMC-microservice thereon,
    wherein:
        the BMC being configured to have a BMC operating system (BMC-OS) executing thereon, wherein the BMC-OS facilitates loading and execution of the BMC-microservice on the BMC,
        the BMC-microservice being an application that is modularized as a container to perform operating system level virtualization in which an operating system kernel allows an existence of multiple isolated user-space instances, and that is configured to interact with the BMC-OS while the BMC-microservice executes on the BMC, and
        the BMC-microservice includes computer-executable instructions that, when executed by the one or more processors of the BMC, cause management of operations of the server or monitoring of status of the server.

2. The system of claim 1, wherein the BMC is configured to access internal sensors to measure physical properties of the motherboard of the server.

3. The system of claim 2, wherein the physical properties are selected from a group consisting of temperature, humidity, power-supply voltage, fan speed, and communication signals.

4. The system of claim 1, wherein the BMC is configured to monitor functions of an operating system of the server.

5. The system of claim 1, wherein the BMC-microservice uses application programming interfaces (APIs) to communicate with the BMC-OS.

6. The system of claim 1 further configured to store multiple different BMC-microservices that are available to be delivered to the BMC upon request, wherein the multiple different VMC-microservices are each modularized as a container and isolated from other BMC-microservices stored on the BMC.

7. The system of claim 1, wherein:
    obtaining the request includes receiving the request from a subscribed user of a server-management service; and
    the microservice management platform is part of the server-management service.

8. A method comprising:
    obtaining, at a microservice management platform, a request for a BMC-microservice for a baseboard management controller (BMC) of a server of a communications network, wherein the BMC of the server has one or more processors that operate independently from a motherboard of the server, wherein the microservice management platform is supported by on one or more computing devices that are remote from the server; and
    delivering, from the microservice management platform and over the communication network, the BMC-microservice to the server that includes the BMC for the BMC to load and execute thereon,
    wherein:
        the BMC being configured to have a BMC operating system (BMC-OS) executing thereon, wherein the BMC-OS facilitates loading and execution of the BMC-microservice on the BMC,
        the BMC-microservice being an application that is modularized as a container to perform system level virtualization in which an operating system kernel allows an existence of multiple isolated user-space instances, and that is configured to interact with the BMC-OS while the BMC-microservice executes on the BMC, and
        the BMC-microservice includes computer-executable instructions that, when executed by the one or more processors of the BMC, cause management of operations of the server or monitoring of status of the server.

9. The method of claim 8, wherein the BMC is configured to access internal sensors to measure physical properties of the motherboard of the server.

10. The method of claim 9, wherein the physical properties are selected from a group consisting of temperature, humidity, power-supply voltage, fan speed, and communication signals.

11. The method of claim 8, wherein the BMC is configured to monitor functions of an operating system of the server.

12. The method of claim 8, wherein the BMC-microservice uses application programming interfaces (APIs) to communicate with the BMC-OS.

13. The method of claim 8 further configured to store multiple different BMC-microservices that are available to be delivered to the BMC upon request, wherein the multiple different BMC-microservices are each modularized as a container and isolated from other VMC-microservices stored on the BMC.

14. The method of claim 8, wherein:
obtaining the request includes receiving the request from a subscribed user of a Server-Management-as-a-Service (SMaaS), and
the microservice management platform is part of the server-management service.

15. A server comprising:
a host system configured to manage access to resources or services in a communication network, the host system includes:
one or more processors, and
one or more non-transitory computer-readable media storing computer-executable instructions that, when executed by the one or more processors, cause the one or more processors to execute a server operating system (server-OS); and
a baseboard management controller (BMC) system configured to have a BMC operating system (BMC-OS) executing thereon, wherein the BMC-OS facilitates loading and execution of a BMC-microservice on the BMC, the BMC system includes:
one or more processors, and
one or more non-transitory computer-readable media storing computer-executable instructions that, when executed by the one or more processors, cause the one or more processors to execute the BMC OS to:
obtain the BMC-microservice from a microservice storehouse on the communication network; and
load and execute the BMC-microservice on the one or more processors of the BMC system,
wherein the BMC-microservice being an application that is modularized as a container to perform operating system level virtualization in which an operating system kernel allows an existence of multiple isolated user-space instances, and that is configured to interact with the BMC-OS while the BMC-microservice executes on the BMC system, and the BMC-microservice includes computer-executable instructions that, when executed by the one or more processors of the BMC system, cause management of operations of the server or monitoring of status of the server.

16. The server of claim 15, wherein the BMC system is configured to access internal sensors to measure physical properties of the host system.

17. The server of claim 16, wherein the physical properties are selected from a group consisting of temperature, humidity, power-supply voltage, fan speed, and communication signals.

18. The server of claim 15, wherein the BMC system is configured to monitor functions of an operating system of the server.

19. The server of claim 15, wherein the BMC-microservice uses application programming interfaces (APIs) to communicate with the BMC-OS.

20. The server of claim 15, wherein the BMC system is configured to load and execute multiple different BMC-microservices obtained from the microservice storehouse, wherein the multiple different BMC-microservices are ach modularized as a container and isolated from other BMC-microservices stored on the BMC.

* * * * *